UNITED STATES PATENT OFFICE.

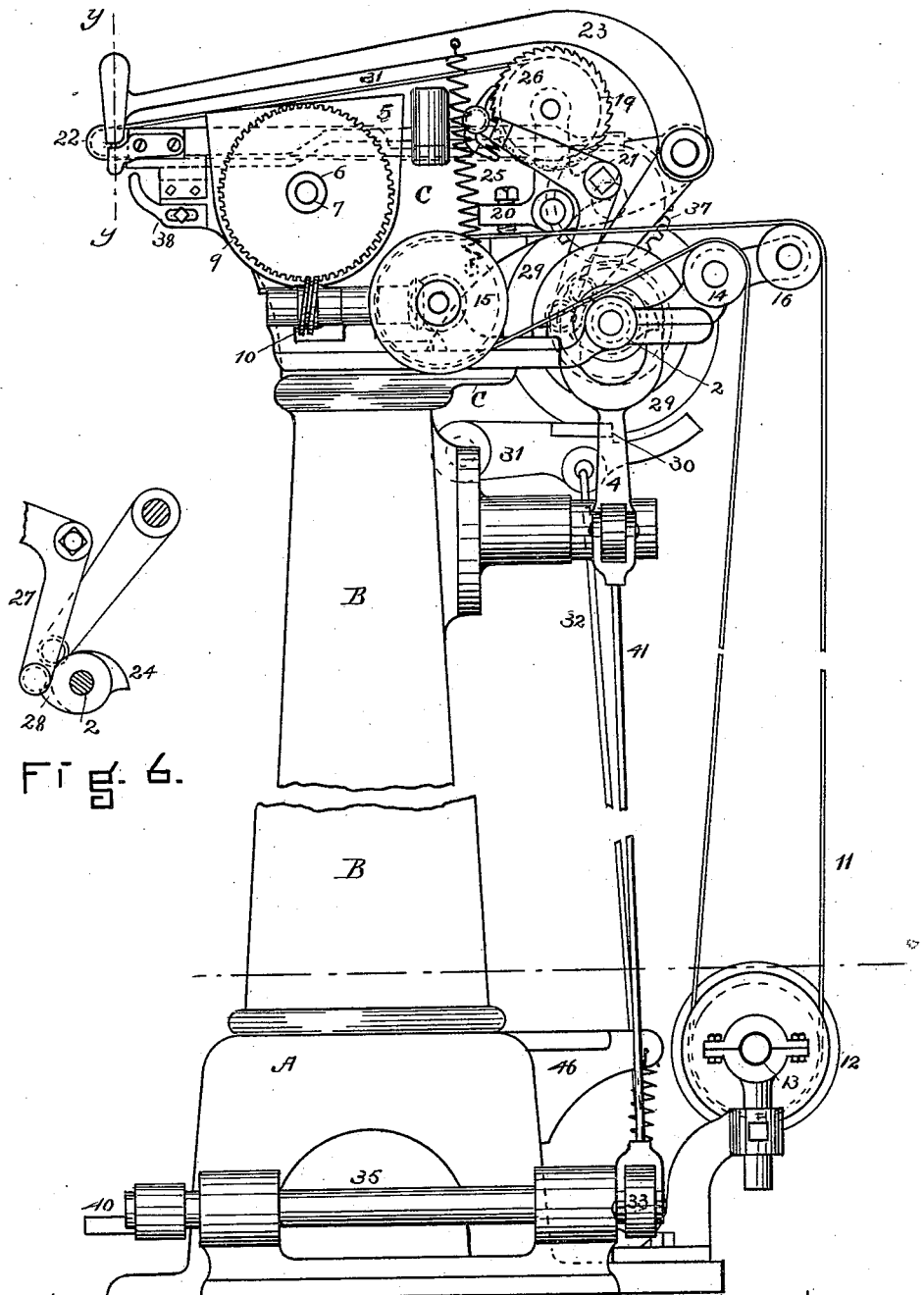

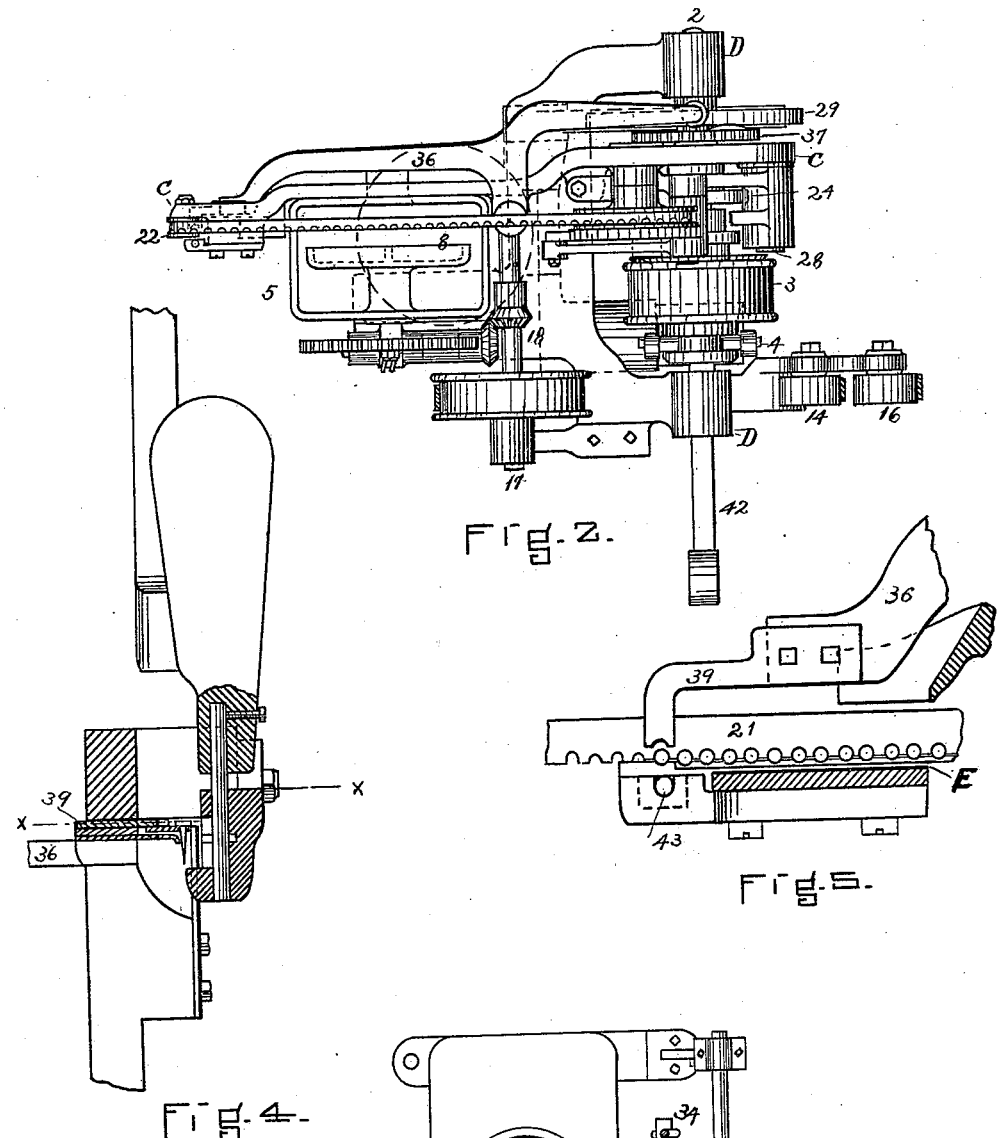

ROBERT ASHE, OF SOMERVILLE, MASSACHUSETTS, ASSIGNOR TO THE ASHE MANUFACTURING COMPANY, OF MAINE.

NAIL-DRIVING MACHINE.

SPECIFICATION forming part of Letters Patent No. 470,137, dated March 1, 1892.

Application filed May 25, 1891. Serial No. 394,078. (No model.)

*To all whom it may concern:*

Be it known that I, ROBERT ASHE, a citizen of the United States, residing at Somerville, in the county of Middlesex and State of Massachusetts, have invented certain new and useful Improvements in Tack and Nail Driving Machines; and I do declare that the following description, with the accompanying drawings, which form a part of this specification, is sufficiently clear and comprehensive to enable others skilled in the art to make the same.

The object of my invention is to provide means for supplying tacks or other nails singly to the action of a driving tool or hammer, especially in the process of lasting boots and shoes.

In the drawings which accompany and form a part of this specification, Figure 1 is a side elevation of my machine. Fig. 2 is a plan of the same. Fig. 3 is a plan of the base, showing counter-shaft and treadle-shaft. Fig. 4 is a vertical section on the line $y\,y$, Fig. 1. Fig. 5 is a horizontal section on the line $x\,x$, Fig. 4; and Fig. 6 is a view of the operating-cams on the shaft 2, Figs. 1 and 2.

A, Fig. 1, is the base of my machine, to which is fastened the column B, which column carries the frame of the head C, Figs. 1 and 2. Projecting back from the frame of the head are two arms carrying the journals D and shaft 2, Figs. 1 and 2.

3, Fig. 2, is a friction-pulley on the shaft 2, which is put in action by the forked bell-crank lever 4, Figs. 1 and 2.

5, Figs. 1 and 2, is a tack or nail receptacle. It is provided with bearings 6, in which is mounted a shaft 7. On this shaft is a wheel 8, Fig. 2, provided with buckets or chambers near its periphery. On the same shaft is also mounted the tangent gear-wheel 9, which wheel is revolved by the worm 10, Figs. 1 and 2. The worm 10 is revolved by means of the belt 11 and pulley 12 on the counter-shaft 13, which belt, passing over the idle pulley 14, revolves the fixed pulley 15 and passes off over the idle pulley 16, Fig. 1. The pulley 15, Figs. 1 and 2, is mounted on the shaft 17. This shaft gives motion to the stud which carries the worm 10 by means of the bevel-gears 18, Fig. 2.
19, Figs. 1 and 2, is a pulley mounted on the upper or long arm of the three-armed lever 20, Fig. 2.

21 is a metallic belt, which passes around the pulley 19, and, as shown in the drawings, Fig. 1, the lower or under part of it passes through the tack or nail chamber above the shaft 7 and on to the extreme front of the machine, where it passes over the small roller 22. This belt is provided with notches on one edge throughout its length, the notches being of suitable size to receive a tack or nail and support the same point downward by the flange of its head. A retaining wall or guard E is provided within the tack or nail chamber, which, when tacks or nails have fallen into the spaces in the belt, prevents them from falling out again. A similar guard is arranged outside of the nail-chamber, which terminates within one space of the point where the tack or nail is to be driven. This arrangement is clearly shown in Fig. 5.

23 is what I call the "hammer-lever" or "driver." The hammer is raised by the cam 24, Figs. 2 and 6, acting on the short arm of the hammer-lever 23. The blow of the hammer is delivered by the spring shown.

26 is a ratchet on pulley 19.

27 is a lever having a ratchet-pawl at one end and being acted on at its other end by the cam 28, Figs. 2 and 6.

29, Figs. 1 and 2, is a plain disk having a notch or ratchet on its periphery. (Shown at 30, Fig. 1.)

31, Fig. 1, is a lever having upon it a surface which fits in the notch and against the ratchet-tooth on the disk 29. This lever is connected by the rod 32, Fig. 1, to the long arm of the lever 33 at 34. (See Fig. 3.) The lever 33 is mounted on the treadle-shaft 35.

37, Figs. 1 and 2, is a gear-wheel mounted on the frame of the head of the machine. Motion is imparted to it by a similar gear-wheel on the shaft 2. The wheel 27 is provided with a cam which acts on the end of the lever 36. A roll on the end of the lever 36 rides against the side of the wheel 37 and is kept in position against said wheel by means of a spring. (Not shown.)

To the front end of the lever 36 I fasten a piece of suitable form 39, which I call the

"fingers." It is provided with an opening in its end just sufficient to allow of the free passage of the belt 21 through it.

The machine shown in the drawings being designed especially for use in the process of lasting boots and shoes, its operation is as follows: The wheel 8, being revolved in the tack-chamber by the means described, raises tacks in the buckets with which it is provided, and as they fall out of the said buckets while passing the highest point they drop on the belt 21, and such of them as fall into the spaces in the belt point downward are retained there, while the rest fall off the belt into the mass of tacks in the chamber again. Now if the treadle 40, Fig. 3, be pressed downward, the long arm of the lever 33 will move in the same direction, while the short end of the lever 33 will be moved in the opposite direction. The forcing down of the long arm of 33 releases the stop-lever 31 from contact with the tooth on the periphery of the disk 29, leaving shaft 2 free to revolve. When the stop-lever is clear of the tooth 30 on the disk 29, the friction-surfaces of the pulley 3 will be in contact through the short arm of lever 33 and its connecting-rod 41 to the arm 42 of the forked bell-crank lever 4. Now as the shaft 2 revolves the cam 24 raises the hammer-lever 23, and as the driver reaches the belt in its upward movement (see Fig. 4) the cam 28 acts on the lower end of lever 27, thereby causing the ratchet-wheel 26 to revolve one tooth, and as ratchet 26 and pulley 19 are connected it is clear that every forward movement of the pawl on lever 27 imparts a corresponding movement to belt 21, thereby causing said belt to carry the tacks that have dropped into the spaces on its edge forward to the point where they are to be driven. When a tack is brought to the proper position to be acted on by the lever 36, the cam on the gear-wheel 37 causes the fingers 39, Fig. 5, to move forward across the path of the belt, carrying a tack and depositing the same in the throat 43.

38 is a gage which can be adjusted in relation to the driver to determine the proper distance from the edge at which the tacks should be driven.

44 is a pulley on counter-shaft 13, from which power is transmitted to friction-pulley 3.

The operation of the wheel 8 in the tack-chamber is continuous. The operation of all the other parts are intermittent. When pressure is removed from treadle 40, it is raised by the spring 45, which spring is connected to the long arm of lever 33 and to an arm 46, projecting from the base of the machine, thus releasing the friction-surface contact in pulley 3 and bringing the lock-lever 31 in contact with the periphery of disk 29 and ready to lock the machine when the ratchet-tooth 30 is presented to the lever.

Having now described my invention, what I claim as new, and desire to secure by Letters Patent, is—

1. In a tack or nail driving machine, the combination of the nail or tack carrying belt 21, the tack pot or reservoir 5, arranged to permit said belt to be fed through it, and the wall or guard E, as herein described, and for the purpose set forth.

2. In a tack-driving machine, in combination with lever 36 and its fingers 39, the belt 21, as described, and for the purpose herein set forth.

ROBERT ASHE.

Witnesses:
CHAS. H. CARTY,
L. ROGER WENTWORTH.